United States Patent
Knott et al.

(10) Patent No.: US 7,512,545 B2
(45) Date of Patent: Mar. 31, 2009

(54) METHOD, SOFTWARE AND SYSTEM FOR DEVELOPING INTERACTIVE CALL CENTER AGENT PERSONAS

(75) Inventors: Benjamin A. Knott, Round Rock, TX (US); Robert R. Bushey, Cedar Park, TX (US); John M. Martin, Austin, TX (US); Stephanie Andrews, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1017 days.

(21) Appl. No.: 10/766,985

(22) Filed: Jan. 29, 2004

(65) Prior Publication Data
US 2005/0169453 A1 Aug. 4, 2005

(51) Int. Cl.
*G06F 17/60* (2006.01)
(52) U.S. Cl. .................. 705/10; 379/265.01; 704/240; 704/275; 706/12
(58) Field of Classification Search ................ 434/350; 379/265.01; 704/275, 240; 706/12; 725/46; 705/10
See application file for complete search history.

(56) References Cited

U.S. PATENT DOCUMENTS

| | | | |
|---|---|---|---|
| 5,027,384 A | 6/1991 | Morganstein | 379/67 |
| 5,675,707 A | 10/1997 | Gorin et al. | 395/2.66 |
| 5,796,394 A | 8/1998 | Wicks et al. | 345/329 |
| 5,850,433 A | 12/1998 | Rondeau | 379/201 |
| 6,081,774 A | 6/2000 | de Hita et al. | 704/9 |
| 6,091,805 A | 7/2000 | Watson | 379/93.17 |
| 6,094,635 A | 7/2000 | Scholz et al. | 704/270 |
| 6,154,527 A | 11/2000 | Porter et al. | 379/88.18 |
| 6,167,370 A | 12/2000 | Tsourikov et al. | 704/9 |
| 6,269,153 B1 | 7/2001 | Carpenter et al. | 379/88.02 |
| 6,314,402 B1 | 11/2001 | Monaco et al. | 704/275 |
| 6,327,566 B1 | 12/2001 | Vanbuskirk et al. | 704/257 |
| 6,411,686 B1 | 6/2002 | Porter et al. | 379/88.18 |
| 6,539,078 B1 | 3/2003 | Hunt et al. | 379/88.04 |
| 6,560,329 B1 | 5/2003 | Draginich et al. | 379/265.02 |
| 7,013,478 B1 * | 3/2006 | Hendricks et al. | 725/46 |
| 2001/0014852 A1 | 8/2001 | Tsourikov et al. | 704/9 |
| 2001/0039490 A1 | 11/2001 | Verbitsky et al. | 704/9 |
| 2001/0049688 A1 | 12/2001 | Fratkina et al. | 707/104.1 |

(Continued)

OTHER PUBLICATIONS

International Search Report and Written Opinion; PCT/US05/29545; pp. 7, Mailing Date Feb. 8, 2006.

*Primary Examiner*—Gerald Gauthier
(74) *Attorney, Agent, or Firm*—Jackson Walker L.L.P.

(57) ABSTRACT

A method, software and system of developing personalities for interactive and/or automated call center applications are provided. According to teachings of the present invention, sample population questionnaires and interviews may be used to identify key personality traits. The impact of the identified key personality traits are then empirically determined. Based on the empirical determination of the key personality traits' impact on customer satisfaction, a plurality of personality profiles may be generated for evaluation. A plurality of application types and voice talents may then be employed to evaluate the impact of each personality profile on customer satisfaction, for different user populations and different types of automated systems. The personality traits for each automated system are preferably rated and reviewed to ensure a system accurately represents the identified key personality traits. The various voice talents may also be evaluated to identify those traits best at conveying a desired personality.

17 Claims, 3 Drawing Sheets

U.S. PATENT DOCUMENTS

| | | |
|---|---|---|
| 2002/0007267 A1 | 1/2002 | Batchilo et al. ................. 704/9 |
| 2002/0010574 A1 | 1/2002 | Tsourikov et al. .............. 704/9 |
| 2002/0022955 A1 | 2/2002 | Troyanova et al. ............. 704/9 |
| 2002/0029203 A1* | 3/2002 | Pelland et al. ................. 706/12 |
| 2002/0045154 A1* | 4/2002 | Wood et al. .................. 434/350 |
| 2002/0087328 A1 | 7/2002 | Denenberg et al. .......... 704/275 |
| 2002/0087497 A1 | 7/2002 | Trolanova et al. ............. 706/45 |
| 2002/0091530 A1 | 7/2002 | Panttaja ...................... 704/275 |
| 2002/0095295 A1* | 7/2002 | Cohen et al. ................. 704/275 |
| 2002/0184002 A1 | 12/2002 | Galli ............................ 704/7 |
| 2002/0193994 A1 | 12/2002 | Kibre et al. .................. 704/260 |
| 2003/0026409 A1 | 2/2003 | Bushey et al. .......... 379/211.02 |
| 2003/0043976 A1 | 3/2003 | Arunachalam ........... 379/88.16 |
| 2003/0061039 A1 | 3/2003 | Levin ......................... 704/246 |
| 2003/0143981 A1 | 7/2003 | Kortum et al. .............. 455/414 |
| 2003/0212558 A1 | 11/2003 | Matula ....................... 704/260 |
| 2004/0032941 A1 | 2/2004 | Graham et al. .............. 379/219 |

* cited by examiner

METHOD, SOFTWARE AND SYSTEM FOR DEVELOPING INTERACTIVE CALL CENTER AGENT PERSONAS

TECHNICAL FIELD OF THE INVENTION

The present invention relates generally to call center technology and, more particularly, to interactive voice-enabled customer service delivery.

BACKGROUND OF THE INVENTION

Recent advancements in the area of automated speech recognition (ASR) technology have enabled the development of reliable, speech enabled, self-service applications allowing customers to complete various call center tasks using automated systems. One important aspect of a user interface for ASR applications is the "application personality." The personality or persona of an ASR application may be generally defined as the general tone, attitude or mood conveyed by the application's "voice", vocabulary used, as well as style of interaction, e.g., formal, conversational, directed, etc.

In the past, there have been no well defined or effective methods for developing ASR application personas. In modern practice, to develop an ASR application system persona, a speech technology vendor will typically interview customer delivery personnel within their client's company in order to understand the client's ASR application expectations. Based on data gathered, the vendor may then create demonstrations of several different types of ASR application personas and present the persona demonstrations to a group of stakeholders for selection. Generally, such a method of ASR application system persona development fails to address the needs or expectations of ASR application end-users and, therefore, generally fails to gain approval by its targeted users.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 5, wherein like numbers are used to indicate like and corresponding parts.

Figure 1:
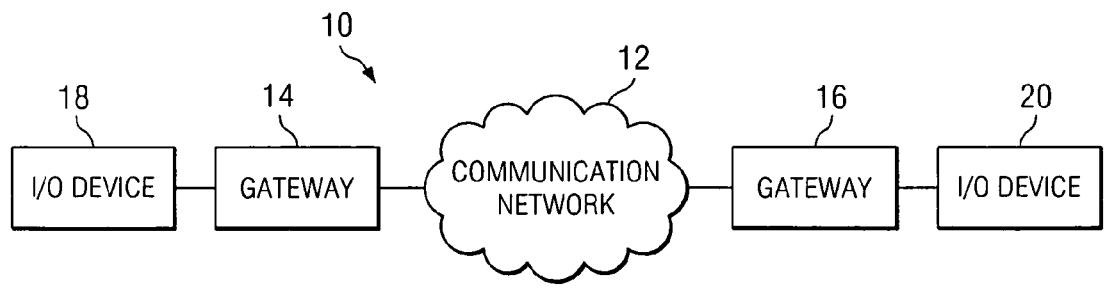
FIG. 1 is a schematic diagram depicting one embodiment of a telecommunications system incorporating teachings of the present invention.

Referring first to FIG. 1, a schematic diagram of an exemplary embodiment of a telecommunications system, indicated generally at 10 is shown. Telecommunication system 10 may include communication network 12 in communication with one or more gateway devices 14 and 16. Input/output (I/O) devices 18 and 20 are each preferably in communication with respective gateway devices 14 and 16. Accordingly, I/O devices 18 and 20 may be in selective communication with each other via gateway devices 14 and 16, and communication network 12.

In one embodiment, communication network 12 may be a public switched telephone network (PSTN). In alternate embodiments, communication network 12 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks.

Gateways 14 and 16 preferably provide I/O devices 18 and 20 with an entrance to communication network 12 and may include software and hardware components to manage traffic entering and exiting communication network 12 and conversion between the communication protocols used by I/O devices 18 and 20 and communication network 12. In some embodiments, gateways 14 and 16 may function as a proxy server and a firewall server for I/O devices 18 and 20. In some embodiments, gateways 14 and 16 may be associated with a router (not expressly shown), operable to direct a given packet of data that arrives at gateway 14 or 16, and a switch (not expressly shown), operable to provide a communication path in to and out of gateway 14 or 16.

In the present embodiment, I/O devices 18 and 20 may include a variety of forms of equipment connected to communication network 12 and accessible to a user. I/O devices 18 and 20 may be telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. I/O devices 18 and 20 may be equipped for connectivity to communication network 12 via a PSTN, DSL, cable network, wireless network, or any other appropriate communications channel.

Figure 2:
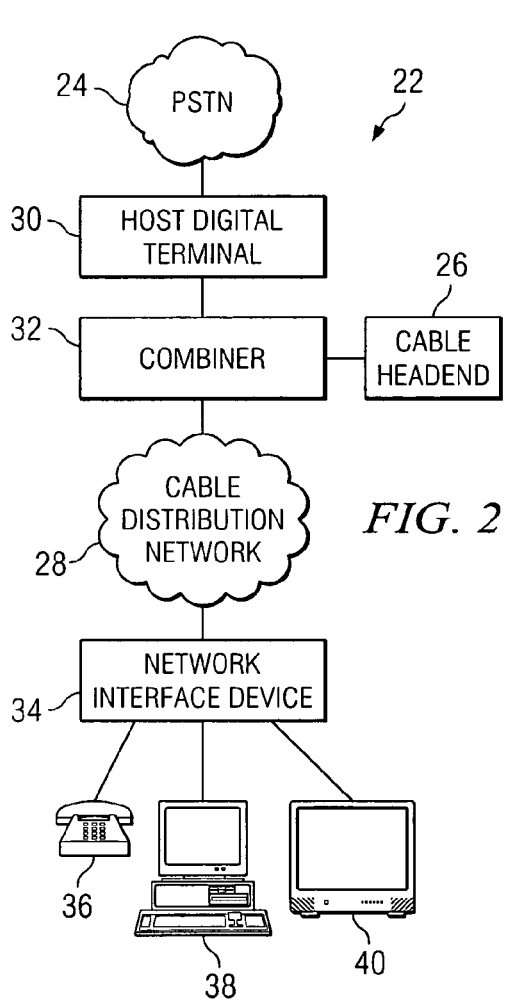
FIG. 2 is a schematic diagram depicting an alternate embodiment of a telecommunications system incorporating teachings of the present invention.

Referring now to FIG. 2, a block diagram of an exemplary embodiment of a telecommunication system 22 is shown. In the exemplary embodiment shown, system 22 preferably includes a PSTN 24 and cable head-end 26 in communication with cable distribution network 28. PSTN 24 may be in operable communication with host digital terminal (HDT) 30 and function to convert signals received from PSTN 24 for transmission over cable networks. Host digital terminal 30 and cable head-end 26 may be in communication with combiner 32. Combiner 32 may communicate data received from cable head-end 26 and/or PSTN 24 to cable distribution network 28. Cable distribution network 28 may further communicate data to network interface device 34 to a user via telephone 36, computer 38, television 40 or any other suitable I/O device. Cable head-end 26 may provide cable television programming and cable modem communications. Cable head-end 26 typically includes a cable modem termination system (not expressly shown) for sending and receiving digital cable modem signals.

Figure 3:
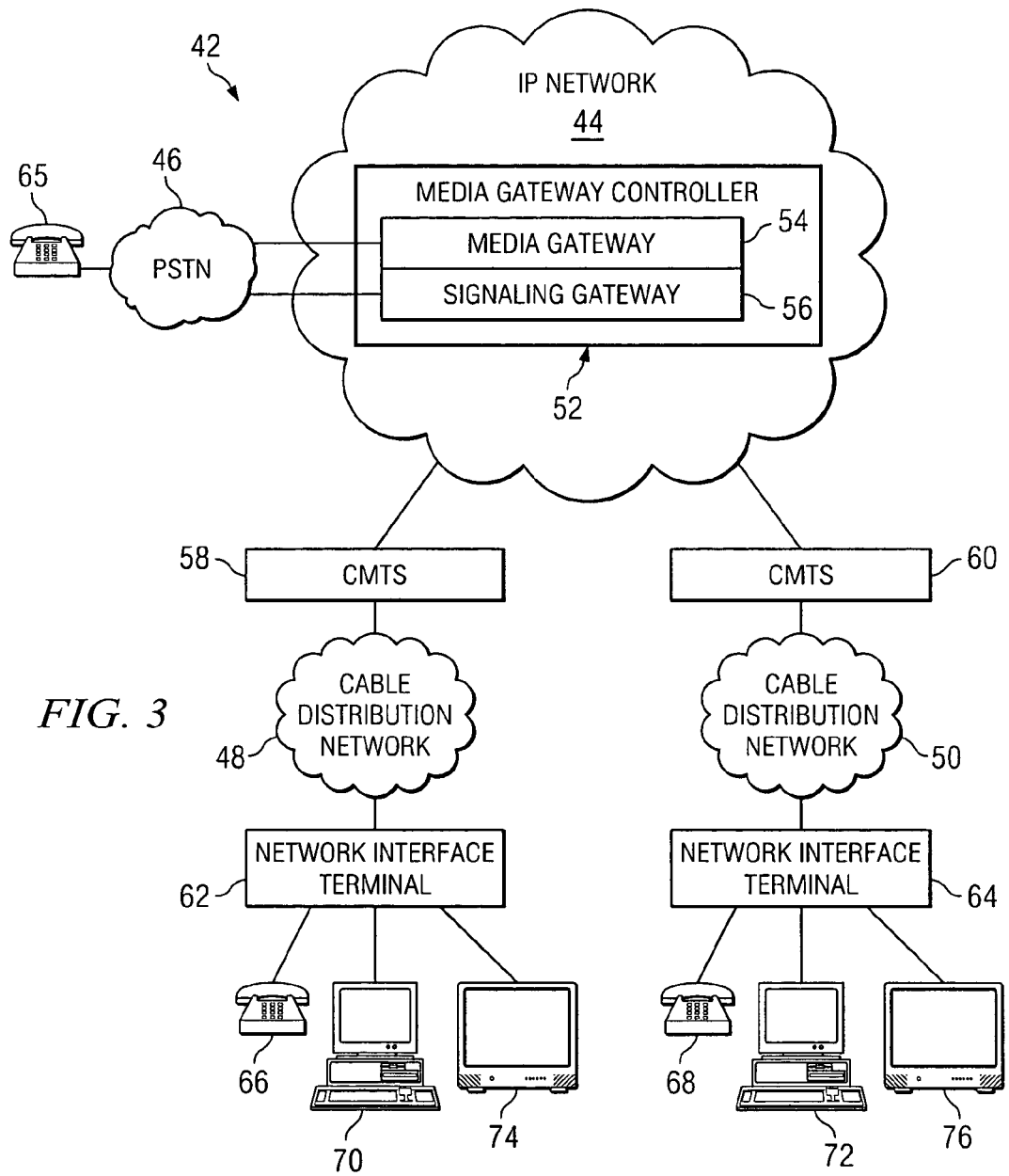
FIG. 3 is a schematic diagram depicting a further embodiment of a telecommunications system incorporating teachings of the present invention.

Referring next to FIG. 3, a block diagram of an exemplary embodiment of a telecommunication system 42 is shown.

This exemplary embodiment generally includes interconnected IP network 44, PSTN 46, and cable distribution networks 48 and 50. IP network 44 may include media gateway controller 52, media gateway 54, and signaling gateway 56. Media gateway 54 and signaling gateway 56 may be in operative communication with PSTN 46 and facilitate communication of information therebetween. IP network 44 may further communicate with cable distribution networks 48 and 50 via cable modem termination systems (CMTS) 58 and 60, respectively. CMTS 58 and 60 may convert IP packets received from IP Network 44 for transmission on cable distribution networks 48 and 50 and convert signals received from cable distribution networks 48 and 50 into IP Packets for transmission to IP Network 44. Cable distribution networks 48 and 50 may communicate information with users via network interface terminals 62 and 64. Network interface terminals 62 and 64 may provide data services to users through I/O devices such as, telephones 66 and 68, computers 70 and 72, and televisions 74 and 76. One or more data services may also be provided to a user through PSTN 46 and one or more I/O devices such as telephone 65.

Telecommunication system 42 of FIG. 3 preferably allows transmission of services to be delivered to users where such services include, without limitation, voice over Internet protocol ("VoIP"), video over Internet, video-on-demand over broadband connections, and the ability to view television and film images as well as broadcasts. In addition, one of ordinary skill will appreciate that other embodiments can be deployed with many variations in the number and type of I/O devices, communication networks, the communication protocols, system topologies, and myriad other details without departing from the spirit and scope of the present invention.

Figure 4:
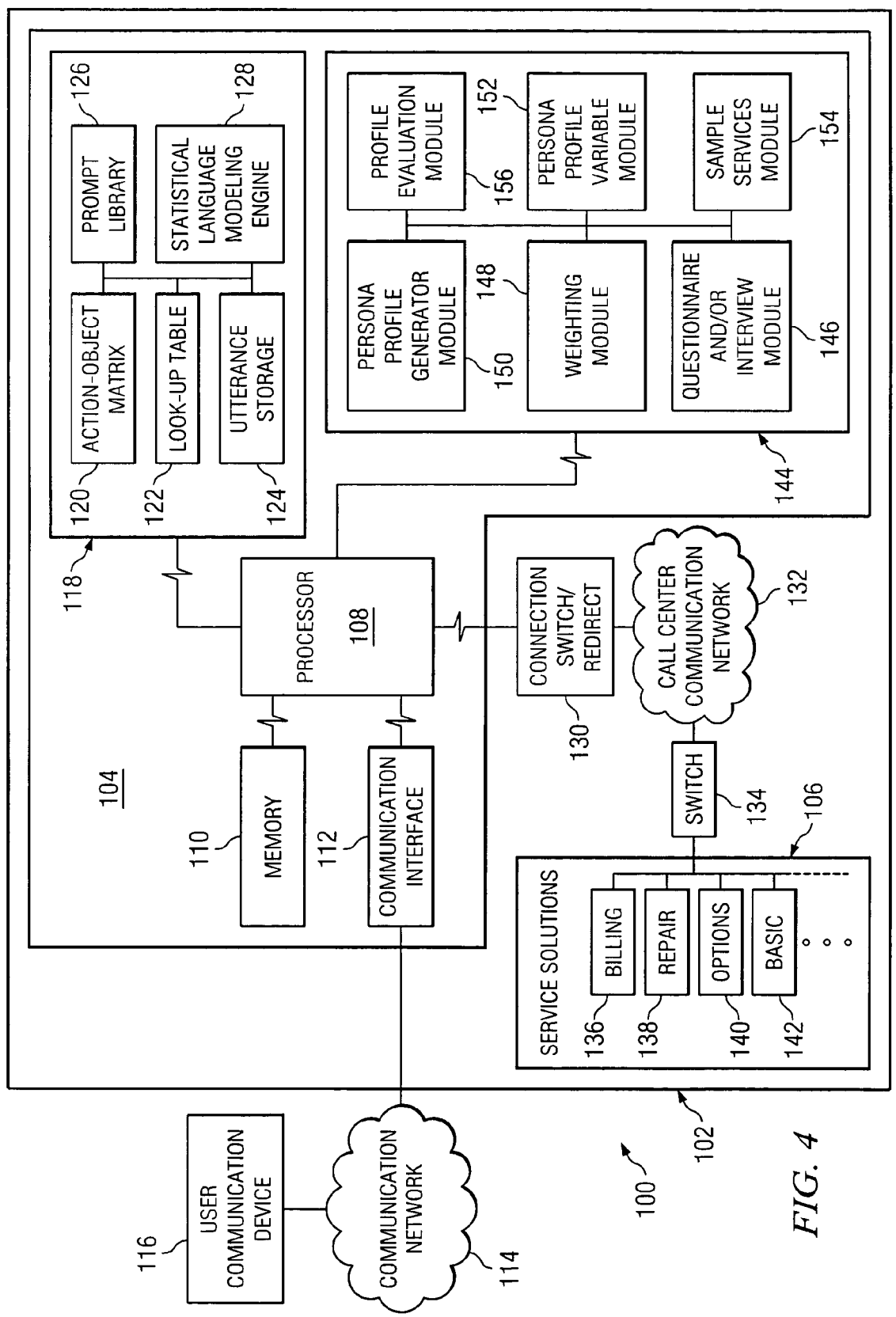
FIG. 4 is a block diagram depicting one embodiment of a call center customer service delivery and agent persona development system incorporating teachings of the present invention.

Referring now to FIG. 4, a block diagram illustrating one embodiment of a call center customer service delivery and agent persona development system incorporating teachings of the present invention is shown. While reference herein is made primarily to a customer service call center and the development of agent personas therefor, alternate implementations of teachings of the present invention may be employed without departing from the spirit and scope thereof.

Illustrated generally at 100 is one embodiment of a system operable to permit a user to perform one or more transactions via a plurality of service agents available from a service center. As illustrated in FIG. 4, system 100 preferably includes service or call center 102. Service or call center 102 may include one or more computing apparatuses 104 operably coupled to one or more transaction processing service solutions or agents 106.

Preferably included in computing apparatus 104, is processor 108. Operably coupled to processor 108 of computing apparatus 104 is memory 110. Computing apparatus 104 preferably employs processor 108 and memory 110 to execute and store, respectively, one or more instructions of a program of instructions.

Also included in computing apparatus 104, as illustrated in FIG. 4, is communication interface 112. Communication interface 112 is preferably operable to couple computing apparatus 104 and/or service or call center 102 to an external communication network 114. According to teachings of the present disclosure, communication network 114 may be implemented as a PSTN, a cable telephony network, an IP telephony network, a wireless network, a hybrid cable/PSTN network, a hybrid IP/PSTN network, a hybrid wireless/PSTN network, or any other suitable communication network or combination of communication networks.

Communication interface 112 preferably cooperates with communication network 114 and user communication device 116 to permit a user to perform one or more transactions via service center 102. User communication device 116 may be a wireless or wireline telephone, dial-up modem, cable modem, DSL modem, or any other appropriate type or combination of communication equipment available to a user.

In operation as a customer service delivery solution, service or call center 102 preferably permits a user, in their natural language, to request processing or performance of one or more transactions available from service solutions or agents 106. To enable such processing, computing apparatus 104 may include or have access to one or more storage devices 118 including one or more programs of instructions substantially operable to interpret the intent of a user, identify a solution sought by the user and route the user to an appropriate service solution agent.

To aid in the interpretation, identification and routing operations of service center 102, storage 118 preferably includes action-object matrix 120, look-up table 122, utterance storage 124, prompt library 126, as well as one or more speech recognition capabilities, such as statistical language modeling engine 128.

In one embodiment of the present invention, computing apparatus 104 is preferably communicatively coupled to one or more connection switches or redirect devices 130. Connection switch or redirect device 130 preferably enables computing apparatus 104, upon determining an appropriate destination for the processing of a user selected transaction, to route the user via communication network 132 and, optionally, one or more switches 134, to an appropriate agent or module of transaction processing service solution 106.

Transaction processing service solution 106 preferably includes a plurality of agents of modules operable to perform one or more operations in association with the processing of a user selected transaction. For example, transaction processing service solution 106 may include one or more agents or modules operable to perform billing service solutions 136, repair service solutions 138, option service solution 140, basic service solutions 142, as well as other service solutions. In addition, the agents or modules implemented in or in association with transaction processing service solutions 106 may include, but are not limited to, automated or self-service data processing apparatuses, live technician support (human support), as well as combinations thereof.

In operation as an aid for developing interactive call center agent personas, computing apparatus 104 preferably includes persona development module 144. According to teachings of the present invention, computing apparatus 104 may cooperate with persona development module 144 to develop one or more call center automated customer service delivery solution or agent personas capable of achieving desired levels of customer satisfaction. As an alternative to the embodiment illustrated in FIG. 4, a system separate and distinct from the system employed by a service provider to deliver automated customer service solutions may be employed without departing from the spirit and scope of the teachings of the present invention. As illustrated in FIG. 4, however, system 102 preferably includes the capability to both aid in the development of service agent personas as well as in the delivery of effective customer service via one or more automated customer service agents as well as one or more automated call routing mechanisms to live agents and/or automated service applications.

As illustrated in FIG. 4, persona development module 144 is preferably operably coupled to processor 108. Persona development module 144 preferably includes questionnaire and/or interview module 146. As is described below, questionnaire and/or interview module 146 may be employed to acquire a number of personality traits that a sample population considers desirable and/or undesirable from an automated service agent from which they seek transactional assistance. In addition, questionnaire and/or interview module 146 may be further employed to obtain from sample population users of service agent personas developed in accordance with teachings of the present invention opinions concerning various aspects of the developed service agent personas. Questionnaire and/or interview module 146 may be used in other respects without departing from the spirit and scope of teachings of the present invention.

Weighting module 148 is preferably also included in persona development module 144. Weighting module 148 may be used to prioritize or otherwise order various personality traits, persona profile evaluations, as well as other values associated with teachings of the present invention. Greater detail concerning the utility of weighting module 148 is discussed below.

Persona profile generator 150 may also be included in one embodiment of persona development module 144. In such an embodiment, persona profile generator module 150 is preferably operable to create one or more service agent persona profiles based on, for example, weightings obtained from weighting module 148, personality traits obtained from questionnaire and/or interview module 146, as well as other factors from various other sources.

Persona profile generator module 150 may leverage one or more persona profile variables available in persona profile variables library or module 152 to create the one or more service agent persona profiles. Persona profile variables library or module 152 may include such persona profile variables as scripts based on tasks, transactions, emotions, seasonal or geographic concerns, expected user groupings, as well as other characteristics. Persona profile variables library or module 152 may also include a number of voice talents which may be leveraged in one or more persona profiles developed by persona profile generator module 150. Persona profile variables library or module 152 may also include a variety of language or dialect selections available to persona profile generator module 150.

To determine the effectiveness of a service agent persona developed in accordance with teachings of the present invention, persona development module 144 preferably includes sample service modules 154. In testing a persona profile developed for example by persona profile generator module 150, the developed persona profile may be used in association with the performance of one or more tasks available from sample service module 154. As is discussed in greater detail below with respect to FIG. 5, profile evaluation module 156 may be leveraged to combine persona profiles developed by persona profile generator module 150 and sample service module 154 to present to a sample population one or more prototype persona profiles in simulated transaction environments so as to elicit sample population feedback from actual, although simulated, transactional applications. In one embodiment, profile evaluation module 156 may cooperate with questionnaire and/or interview module 146 elicit sample population feedback following sample population utilization of one or more developed persona profiles in association with one or more sample services available from persona development module 144. Alterations or additions may be made to persona development module 144 without departing from the spirit and scope of teachings of the present invention.

Figure 5:
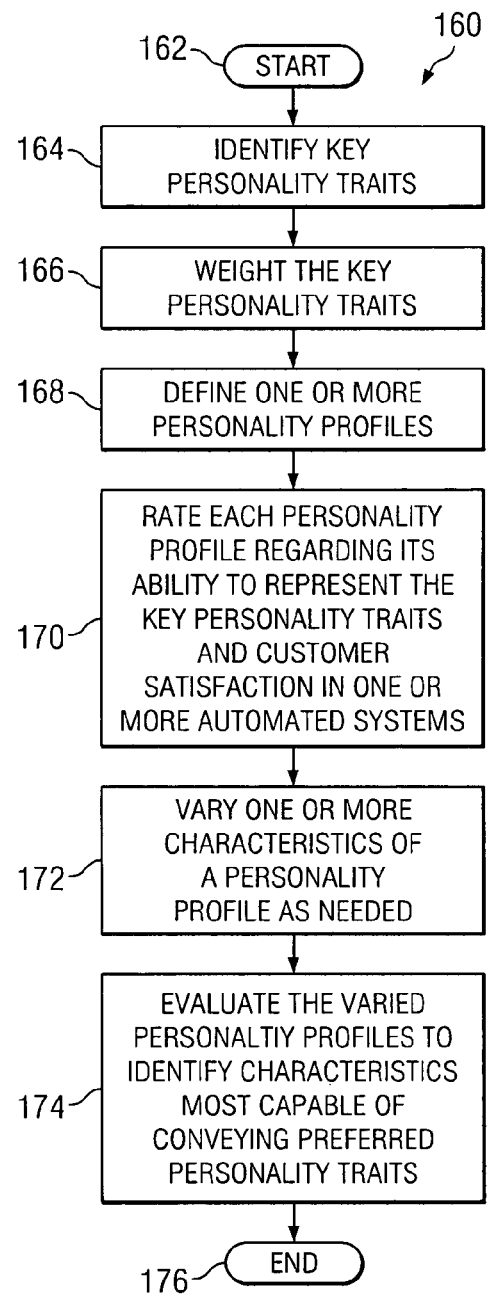
FIG. 5 is a flow diagram depicting one embodiment of a method for developing automated speech recognition application personas incorporating teachings of the present invention.

Referring now to FIG. 5, a flow diagram illustrating one embodiment of a method for developing automated speech recognition application personas is shown according to teachings of the present invention. In a preferred embodiment, utilization of method 160 in FIG. 5 preferably results in identification and generation of one or more preferred, optimized and appropriate personas for use in a call center automated speech recognition application.

After beginning at 162, method 160 preferably proceeds to 164 where a plurality of key personality traits may be identified. In one aspect, the key the personality trait discovery process preferably performed at 164 results in the generation, creation and/or selection of one or more personality types or profiles based on customer data identifying those personality traits considered to be desirable as well as those personality traits considered undesirable from an automated speech recognition application.

The identification or determination of key personality traits at 164 may be performed in a variety of manners. For example, one or more questionnaires may be presented to a test population, preferably a sample population of actual or potential end-users or customers. The questionnaires are preferably directed to isolation of those personality traits desirable and/or undesirable by the test population in their interactions with an ASR application. In addition to, or in lieu of, the questionnaires, one or more interviews may be conducted with members of the designated or selected test population in an effort to identify those personality traits that should be included in an automated speech recognition application as well as those personality traits that should be avoided in preferred implementations of automated speech recognition applications.

The means by which one or more questionnaires and/or one or more interviews may be effected are numerous. For example, one or more questionnaires and/or one or more interviews with members of a selected or designated test population may be effected through the use of live questionnaire takers and/or interviewers. In an alternate embodiment, or in addition to live questionnaire takers and interviewers, one or more questionnaires and/or one or more interviews may be conducted with members of a selected or designated test population using a questionnaire software application or program implemented and effected on one or more computer systems. A questionnaire response system that conducts questionnaires with members of a selected test population via telephone, as well as via other means. Similarly, interviews may be conducted with members of a selected test population using interview software or applications implemented on one or more computer systems, automated interview applications available to members of the selected or designated test population via a PSTN system, as well as via other means.

In one embodiment of the key personality trait identification operations preferably performed at 164 of method 160, a variety of phases may be implemented. For example, in a first phase, members of a selected or designated test population may be asked to rate a number of personality traits, for example, on a scale of one-to-five and ranging from "very desirable" to "very undesirable." In requesting test population rating of various personality traits, members of the test population may be asked for their rating of various personality traits in the context of what personality traits members of the designated test population would desire from an automated speech recognition application they sought to use to help them perform one or more transactions. In a second phase, members of a selected or designated test population may be asked to list those traits felt to be most desirable and most undesirable in an automated speech recognition application from which they sought assistance. In a third phase of one implementation of the identification of key personality traits at 164, members of a selected or designated test population may be presented with a plurality of voice prompts from a plurality of different prototypes for a "how to use" self service automated speech recognition application or an alternate embodiment of an ASR application. After listening to each set of voice prompts, members of the selected or designated test population may be asked to rate each prototype based on how strongly the prototype can be associated with a plurality of key personality traits. In one aspect, the plurality of key personality traits to which members of the test population may be asked to evaluate the voice prompts and prototypes, may be a subset of those key personality traits identified in phase one above. Also in phase three, members of the selected or designated test population may be asked, in addition to rating the prototypes with respect to the various key personality traits, to complete a prototype customer satisfaction questionnaire from which a prototype customer satisfaction score may be derived. Assignment of customer satisfaction scores may be performed on a variety of customer satisfaction scales, e.g., one-to-ten, like versus dislike, etc.

After identifying one or more key personality traits at 164, method 160 preferably proceeds to 166 where one or more of the key personality traits may be weighted. In one aspect, weighting the identified key personality traits at 166 may include the performance of a one-way ANOVA (analysis of variance) for each identified personality trait to determine if a variety of ASR application systems or prototypes differ significantly with respect to each key personality trait. In addition, the performance of a one-way ANOVA, or other appropriate statistical test, on each key personality trait may also be used to identify or indicate whether there exists reliable differences between ASR application prototypes with respect to one or more selected key personality traits. Further, similar to that analysis performed for each personality trait described above, a one-way ANOVA may be performed and taken into consideration regarding the customer satisfaction ratings assigned in phase three above, for example, with regards to how each customer satisfaction rating reflects on each of the plurality of prototypes presented to members of a selected or designated test population. According to teachings of the present invention, alternative statistical analysis may be performed on data compiled herein and the present invention is not limited to statistical data analysis via a one-way ANOVA.

In addition to the performance of a one-way ANOVA on various results of the key personality trait identification operations preferably performed at 164, a regression analysis may also be performed on various data obtained. For example, in one embodiment, a regression analysis may be conducted to determine or define relationships between one or more selected, significant or otherwise preferred key personality traits and customer satisfaction levels or ratings. In one aspect, a regression analysis may be leveraged to identify one or more of the strongest key personality trait predictors of customer satisfaction. Additional weighting methodologies may be applied to data obtained without departing from the spirit and scope of the present invention.

Following the weighting of key personality traits at 166, method 160 preferably proceeds to 168 where one or more personality profiles may be defined or created. In general, method 160 provides for obtaining data in an attempt to identify the importance of various personality traits using a variety of methods. Preferably, the outcome of the application of these various methods is to facilitate or enable the definition or creation of one or more ASR application personas or personalities based on at least those key personality traits the selected or designated test population have indicated as important. At 168, one or more identified key personality traits may be selected for further examination. In one embodiment, selection of one or more key personality traits may be performed in accordance with the results of the weighting operations preferably performed at 166.

Following selection of one or more traits for further examination, selected key personality traits are preferably assigned to one or more groups. Assignment to groups may be based on, for example, results from a cluster analysis. For example, a cluster analysis performed on a plurality of selected key personality traits may yield a "professional" cluster including such key personality traits as "professional", "mature", "formal" and "intelligent" as well as a "personable" cluster including such key personality traits as "personable", "friendly", and "fun/interesting". From the groupings of key personality traits resulting from, for example, a cluster analysis, one or more ASR application prototype personas or personality profiles may be created, defined or otherwise generated.

Definition of a personality profile from a grouping of personality traits may be effected through a variety of methods. For example, taking into consideration the "professional" cluster mentioned above, a personality profile emphasizing such key personality traits as professional, formal and knowledgeable/intelligent may be defined for an ASR application which includes prompts using fewer contractions, less dialogue and taking on a more professional and efficient tone. In another example, taking into consideration the characteristics of the "personable" cluster described above, a personable personality profile emphasizing key personality traits including personable, friendly and fun/interesting may be defined for an ASR application personality profile using a conversational dialogue style and employing informal language. Further, the prompts in a "personable" personality profile may be more verbose, use contractions and take on a generally more friendly and helpful tone.

In the development, definition or creation of one or more ASR application personality profiles from the selected personality traits at 168, key personality traits common to each of the groupings resulting from a cluster analysis, for example, may be reflected in each of the defined or created personality profiles. For example, the key personality traits of "mature" and "knowledgeable" may be important to users of both a "professional" automated speech recognition application and users of a "personable" automated speech recognition application. Other methods of defining or creating one or more ASR application personality profiles from identified personality traits at 168 may be employed. In addition, various other methods of grouping key personality traits identified as desirable by members of a selected test population may also be employed without departing from the spirit and scope of the present invention.

Following the creation, definition or description of one or more ASR application personality profiles at 168, method 160 preferably proceeds to 170 where each personality profile is preferably rated regarding its ability to represent key personality traits and deliver customer satisfaction in one or more automated ASR application systems. In a preferred embodiment, the rating of defined or created personality profiles may be performed by presenting the prototype personality profiles to members of the selected or designated test populations in a plurality of simulated automated speech recognition applications. In a preferred embodiment, the presentation of prototype personality profiles is preferably performed in one or more simulated automated speech recognition applications including one or more "automated call routing" automated speech recognition application as well as one or more "how-to-use" automated speech recognition application.

As presented to members of the selected or designated test population, the simulated automated speech recognition applications preferably include a variety of differing characteristics. In a first aspect, each of the plurality of simulated automated speech recognition applications may employ one or more voice talents. In addition, the plurality of simulated automated speech recognition applications, including both the automated call routing and the how-to-use automated speech recognition applications, are designed to simulate a variety of tasks, transactions or operations to be performed by members of the selected test population, the simulated tasks reflective of those likely to be available in an actual call-center implementation.

In presentation to members of the test population, members of the selected or designated test population preferably use each simulated automated speech recognition application the same number of times, where the number of uses is preferably two or more. Preferably on each instance of presentation to members of the selected or designated test population, the simulated automated speech recognition applications preferably present different combinations of personality and voice talent characteristics. Following each use, members of the selected or designated test population preferably complete one or more customer satisfaction questionnaires and/or interviews. In addition, following each use of the simulated automated speech recognition applications, members of the test population preferably respond to one or more questionnaires and/or interviews directed at rating the automated speech recognition application personas or personalities on a plurality of personality traits. In a first aspect, the one or more questionnaires and/or interviews conducted with members of the selected or designated test population are preferably directed to confirming that the personality profiles and their associated characteristics embody identified and/or desired personality traits. In addition, a goal of the one or more questionnaires and/or interviews conducted with members of the selected or designated test population may be directed at identification of additional personality traits to be considered in developing a persona for an automated speech recognition application.

Responses to the one or more questionnaires and/or interviews by members of the selected or designated test population concerning their rating of each personality profile and associated automated speech recognition application regarding customer satisfaction may be measured by taking an average of the customer satisfaction questionnaire and/or interview results. After calculating averages, the averages may be converted into a percentage score with the scores weighted according to the size of a subject segment of the selected or designated test population. Following weighting, each personality profile, in light of its associated automated speech recognition application, may be evaluated to determine whether it achieves a desired level of customer satisfaction. Evaluating whether a personality profile in light of its associated automated speech recognition application meets with expected customer satisfaction levels, may be determined in accordance with a variety of methodologies.

Method 160 may proceed to 170 and 172 if, at 170, it is determined that a prototype personality profile defined from the selected or identified personality traits does not achieve a desired level of customer satisfaction or fails to meet one or more desired metrics or benchmarks. At 172, one or more characteristics of a defined, prototype or testing personality profile may be altered or varied in an attempt to bring the sample personality profile into accordance with a desired level of customer satisfaction or other desirable trait. Characteristics of a personality profile that may be changed or varied in an effort to achieve a desired level of customer satisfaction include, but are not limited to, voice talent, dialogue content, tone, grammar, word choice, as well as myriad other characteristics of the automated speech recognition application personality profile.

At 174, a varied or redefined prototype or testing personality profile may be reevaluated to determine whether changes made at 172 bring the varied personality profile into accordance with a desired level of customer satisfaction or meet other characteristics. At 174, one or more operations associated with operations preferably performed at 170 may be repeated to measure the level of customer satisfaction from a varied or altered automated speech recognition application personality profile. Method 160 may end at 176.

Although the disclosed embodiments have been described in detail, it should be understood that various changes, substitutions and alterations can be made to the embodiments without departing from their spirit and scope. For example, one or more of the operations performed in method 170 may be repeated until a personality profile or persona meeting a desired or preferred level or customer satisfaction, user completion, efficiency, or other benchmarks or metrics are met. In addition, while reference herein is made primarily to automated speech recognition applications, teachings of the present invention may be applied to the development of personality profiles or personas for other automated and/or interactive customer service delivery implementations.

What is claimed is:

1. A method for developing an automated speech recognition application persona, comprising:
   identifying personality traits key to customer satisfaction; assigning values to the identified personality traits;
   defining a plurality of personality profiles based on the assigned values; evaluating measurable customer satisfaction effects associated with each personality profile;
   rating the personality profiles regarding their ability to represent key personality traits in one or more selected automated systems wherein the rating includes eliciting sample population feedback following sample population utilization of the personality profiles;
   varying one or more characteristics of the personality profiles; and
   evaluating the varied personality profile characteristics to identify characteristics most capable of conveying preferred personality traits.

2. The method of claim 1, further comprising assigning empirical weightings to the identified personality traits using regression analysis.

3. A method of claim 2, further comprising performing a one-way analysis of variance for each identified personality trait.

4. The method of claim 2, further comprising performing the regression analysis on the identified personality traits to determine a relationship between the identified personality traits.

5. The method of claim 1, further comprising identifying the personality traits key to customer satisfaction using interviews with a sample population.

6. The method of claim 1, further comprising identifying personality traits key to customer satisfaction using questionnaires with a sample population.

7. The method of claim 1, further comprising varying an application in which a personality profile is to be used to rate the ability of the personality profile to represent the key personality traits of customer satisfaction.

8. The method of claim 1, further comprising varying characteristics of a test population used to rate the personality profiles regarding an ability to represent the key personality traits in one or more automated systems and in evaluating the varied personality profile characteristics to identify the characteristics most capable of conveying preferred personality traits.

9. The method of claim 1, further comprising varying one or more verbal characteristics of each personality profile to identify characteristics most capable of conveying preferred personality traits.

10. A system for developing customer service applications, comprising:
- at least one processor;
- memory operably associated with the processor; and
- a program of instructions storable in the memory and executable by the processor, the program of instructions operable to elicit key personality traits from a sample population, order the key personality traits according to customer satisfaction relevance, create one or more customer service application personality profiles based on the ordered personality traits, evaluate the customer service application personality profiles for a customer satisfaction level determination, and modify one or more aspects of each customer service application personality profile not in accordance with a desired level of customer satisfaction wherein the instructions operable to evaluate include instructions operable to elicit sample population feedback following sample population utilization of the personality profiles.

11. The system of claim 10, further comprising the program of instructions operable to conduct at least one of a sample population interview and a sample population questionnaire to elicit key personality traits from the sample population.

12. The system of claim 10, further comprising the program of instruction operable to perform at least one of an analysis of variance and a regression analysis on the key personality traits to order the key personality traits.

13. The system of claim 10, further comprising the program of instructions operable to modify verbal characteristics of each personality profile to bring the personality profile into accordance with the desired level of customer satisfaction.

14. The system of claim 10, further comprising the program of instructions operable to modify the personality profiles in accordance with an associated automated customer service application operating environment to achieve the desired level of customer satisfaction.

15. The system of claim 14, further comprising the program of instructions operable to vary operational aspects of the associated automated customer service application to achieve the desired level of customer satisfaction.

16. The system of claim 14, further comprising the program of instructions operable to vary one or more goals of the automated customer service application to achieve the desired level of customer satisfaction.

17. A method for managing an automated speech for developing an automated speech recognition application persona, comprising:
- identifying a set of personality traits;
- assigning a set of weighting values to the set of identified personality traits to define a personality profile;
- defining a set of personality profiles based on the assigned values; and
- rating the personality profiles based on their respective ability to a predetermined level of customer satisfaction in one or more selected automated systems wherein the rating includes eliciting sample population feedback following sample population utilization of the personality profiles;
- varying one or more characteristics of the personality profiles; and
- evaluating the varied personality profile characteristics to identify characteristics most capable of conveying preferred personality traits.

* * * * *